US012571406B2

(12) United States Patent
Wang et al.

(10) Patent No.: US 12,571,406 B2
(45) Date of Patent: Mar. 10, 2026

(54) FAN BLADE STRUCTURE, FAN, AND FAN LIGHT

(71) Applicants: SUZHOU OPPLE LIGHTING CO., LTD., Suzhou City (CN); OPPLE LIGHTING CO., LTD., Shanghai (CN)

(72) Inventors: Xiaolei Wang, Suzhou City (CN); Guobao Zhang, Suzhou City (CN); Shang Li, Suzhou City (CN); Yaohai Wang, Suzhou City (CN)

(73) Assignees: SUZHOU OPPLE LIGHTING CO., LTD., Suzhou City (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/542,598

(22) Filed: Dec. 16, 2023

(65) Prior Publication Data

US 2024/0117813 A1 Apr. 11, 2024

Related U.S. Application Data

(63) Continuation of application No. PCT/CN2022/101772, filed on Jun. 28, 2022.

(30) Foreign Application Priority Data

Jun. 30, 2021 (CN) ......................... 202110743929.3
Jun. 30, 2021 (CN) ......................... 202121481087.0

(51) Int. Cl.
*F04D 29/38* (2006.01)
*F04D 25/08* (2006.01)
(Continued)

(52) U.S. Cl.
CPC ........... *F04D 29/388* (2013.01); *F04D 25/08* (2013.01); *F04D 25/088* (2013.01); *F04D 29/36* (2013.01);
(Continued)

(58) Field of Classification Search
CPC ...... F04D 29/388; F04D 25/08; F04D 25/088; F04D 29/36; F04D 29/384; F21V 33/0096
See application file for complete search history.

(56) References Cited

U.S. PATENT DOCUMENTS 4,046,488 A * 9/1977 Wickham .............. F04D 29/388 416/236 R
8,807,938 B2 * 8/2014 Villella ................ F04D 25/088 416/143
(Continued)

FOREIGN PATENT DOCUMENTS

CN 207634376 U 7/2018
CN 208348153 U 1/2019
(Continued)

OTHER PUBLICATIONS

International Search Report of PCT Application No. PCT/CN2022/101772 dated Oct. 9, 2022 with English translation, (6p).

*Primary Examiner* — Courtney D Heinle
*Assistant Examiner* — Andrew J Marien
(74) *Attorney, Agent, or Firm* — Arch & Lake LLP; Hao Tan; Shen Wang

(57) ABSTRACT

The present disclosure discloses a fan blade structure, a fan and a fan lamp, belonging to the field of household appliances. A fan blade structure includes: an inner edge located at a windward side, where the inner edge at least partially protrudes towards a leeward side, and the inner edge extends obliquely upwards, gradually, from one end of the fan blade structure close to a rotational axis to one end of the fan blade
(Continued)

structure facing away from the rotational axis; an outer edge located at the leeward side, where the outer edge protrudes towards the leeward side, and the outer edge extends obliquely upwards from the end of the fan blade structure close to the rotational axis to the end of the fan blade structure facing away from the rotational axis; and a cambered surface connected between the inner edge and the outer edge.

12 Claims, 4 Drawing Sheets

(51) Int. Cl.
*F04D 29/36* (2006.01)
*F21V 33/00* (2006.01)
(52) U.S. Cl.
CPC ........ *F04D 29/384* (2013.01); *F21V 33/0096* (2013.01)

(56) References Cited

U.S. PATENT DOCUMENTS

| | | | | |
|---|---|---|---|---|
| 9,506,644 | B2 * | 11/2016 | Liu | F21V 33/0096 |
| 2006/0042894 | A1 | 3/2006 | Lee et al. | |
| 2006/0140769 | A1 * | 6/2006 | Frampton | F04D 29/362<br>416/210 R |
| 2010/0129225 | A1 * | 5/2010 | Itou | F04D 29/023<br>416/204 R |
| 2011/0280711 | A1 * | 11/2011 | Liu | F04D 25/088<br>415/140 |
| 2011/0318202 | A1 * | 12/2011 | Care | F04D 25/088<br>417/410.1 |
| 2012/0045331 | A1 * | 2/2012 | Villella | F04D 29/362<br>416/5 |
| 2015/0276207 | A1 * | 10/2015 | Liu | F21V 33/0096<br>416/5 |
| 2018/0258946 | A1 * | 9/2018 | Zhou | F04D 29/366 |
| 2020/0362878 | A1 * | 11/2020 | Li | F21V 33/0096 |

FOREIGN PATENT DOCUMENTS

| | | | |
|---|---|---|---|
| CN | 209324741 | U | 8/2019 |
| CN | 210196068 | U | 3/2020 |
| CN | 111997925 | A | 11/2020 |
| CN | 212296975 | U | 1/2021 |
| CN | 112555181 | A | 3/2021 |
| CN | 113266590 | A | 8/2021 |
| CN | 215672787 | U | 1/2022 |
| TW | 604841 | U | 12/2020 |

* cited by examiner

FAN BLADE STRUCTURE, FAN, AND FAN LIGHT

CROSS-REFERENCE TO THE RELATED APPLICATION

This application is based upon and claims the priority of PCT patent application No. PCT/CN2022/101772 filed on Jun. 28, 2022 which claims priority to the Chinese patent application No. 202110743929.3 filed on Jun. 30, 2021 and the Chinese patent application No. 202121481087.0 filed on Jun. 30, 2021, the entire contents of which are hereby incorporated by reference herein for all purposes.

TECHNICAL FIELD

The present disclosure belongs to the technical field of household appliances, and particularly relates to a fan blade structure, a fan, and a fan lamp.

BACKGROUND

Some fans or fan lamps use straight-shaped fan blades or circular ring-shaped impellers to provide air circulation. However, when these fans or fan lamps rotate during working, the straight-shaped fan blades cannot effectively stir up the air, resulting in insufficient wind power.

SUMMARY

The present disclosure provides a fan blade structure, a fan, and a fan lamp.

The examples of the present disclosure provide a fan blade structure, including:

- an inner edge, located at a windward side, wherein the inner edge at least partially protrudes towards a leeward side, and the inner edge extends obliquely upwards, gradually, from one end of the fan blade structure close to a rotational axis to one end of the fan blade structure facing away from the rotational axis;
- an outer edge, located at the leeward side, wherein the outer edge protrudes towards the leeward side, and the outer edge extends obliquely upwards, gradually, from the end of the fan blade structure close to the rotational axis to the end of the fan blade structure facing away from the rotational axis, and a horizontal height of the outer edge is lower than a horizontal height of the inner edge; and
- a cambered surface, wherein the cambered surface is connected between the inner edge and the outer edge, and the cambered surface extends curvedly downwards from the inner edge to the outer edge; wherein
- a thickness of the fan blade structure decreases from the end close to the rotational axis to the end facing away from the rotational axis.

The examples of the present disclosure provide a fan, including a fan body and a plurality of fan blade structures as described above; and the plurality of fan blade structures are arranged on the fan body, and can be folded or unfolded.

The examples of the present disclosure provide a fan lamp, including a lamp assembly and the fan as described above; and the lamp assembly is arranged at a lower part of the fan.

It is to be understood that both the foregoing general description and the following detailed description are exemplary and explanatory only and are not restrictive of the present disclosure.

DETAILED DESCRIPTION

Figure 1:
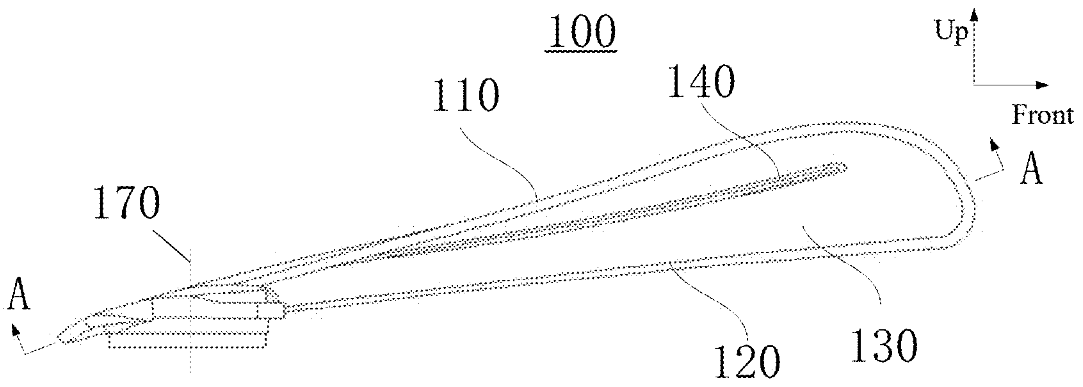
FIG. 1 is a first perspective view of a fan blade structure disclosed in examples of the present disclosure.

The technical solution in the examples of the present disclosure is described in connection with the drawings accompanying the examples of the present disclosure. The described examples are a part of but not all the examples of the present disclosure. Based on the examples in the present disclosure, all other examples obtained by ordinary skilled in the art without creative work belong to the scope of protection of the present disclosure.

The terms "first", "second" and the like in the specification and claims of the present disclosure are used to distinguish similar objects, and are not used to describe a specific order or sequence. It should be understood that, the data used in this way can be interchanged under appropriate circumstances, so that the examples of the present disclosure can be implemented in an order other than those illustrated or described here, and the objects distinguished by "first", "second" and the like are usually of the same type, and the number of the objects is not limited, for example, the first object can be one or multiplicity. In addition, "and/or" in the specification and claims refers to at least one of the connected objects, and the character "/" generally refers to that the contextual objects are in an "or" relationship.

Reference numerals used in this disclosure may include: 100—Fan blade structure; 110—Inner edge; 111—First cambered segment; 112—Second cambered segment; 120—Outer edge; 130—Cambered surface; 140—Reinforcing rib; 150—Sharp angle structure; 160—Guiding member; 200—Rotating assembly; 210—Rotating disk; 211—Guiding groove; 212—Installation part; 300—Driving assembly; 400—lamp assembly; 500—Suspending assembly; 510—Fixed seat; 520—Connecting rod; 600—Fastener; M—Gap.

Some fans or fan lamps may use straight-shaped fan blades or circular ring-shaped impellers to provide air circulation. However, when these fans or fan lamps rotate during working, the straight-shaped fan blades cannot effectively stir up the air, resulting in insufficient wind power. Additionally, the straight-shaped fan blades may be susceptible to deformation and bending when subjected to air impact, which can affect the service life of the fans or fan lamps. Furthermore, the circular ring-shaped impellers experience high aerodynamic resistance, which causes louder noise to be generated when air comes into contact with surfaces of the circular ring-shaped impellers.

In the following, the technical solution in the examples of the present disclosure will be described in details through examples and their application scenarios, in conjunction with the accompanying drawings.

Referring to FIG. 1 to FIG. 7, examples of the present disclosure disclose a fan blade structure 100 that can be applied to products such as fans or fan lamps. By rotating the fan blade structure 100, products such as fans or fan lamps can drive air to flow, thereby achieving a blowing effect. In order to further enhance the overall performance of the fan blade structure 100, such as increasing the wind power, reducing the noise, and improving the strength, the examples of the present disclosure redesign the shape and the structure of the fan blade structure 100. Compared to some straight-shaped fan blades or impeller-shaped fan blades, the fan blade structure 100 in the examples of the present disclosure has superior performance.

Figure 3:
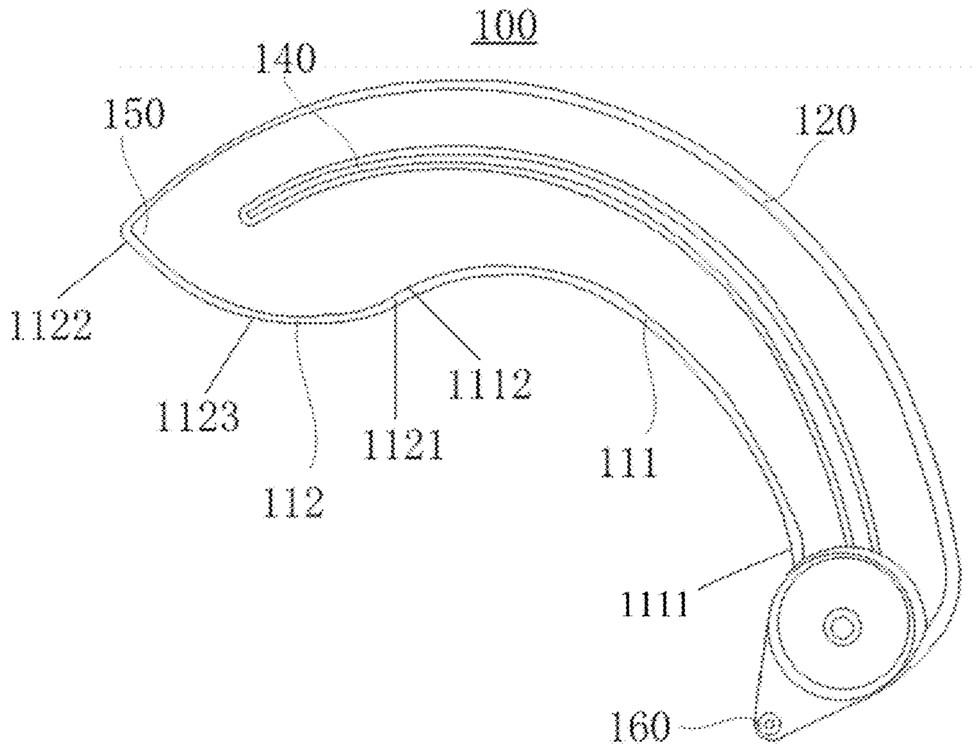
FIG. 3 is a second perspective view of a fan blade structure disclosed in examples of the present disclosure.

Referring to FIG. 1 and FIG. 3, the disclosed fan blade structure 100 includes an inner edge 110, an outer edge 120, and a cambered surface 130. The inner edge 110 is located at a windward side of the fan blade structure 100. When the fan blade structure 100 rotates, the inner edge 110 preferentially contacts the airflow, and the airflow flows into the fan blade structure 100 from the inner edge 110. The outer edge 120 is located at a leeward side of the fan blade structure 100. When the fan blade structure 100 rotates, the airflow separates from the fan blade structure 100 through an area of the outer edge 120. Based on the above configuration, the inner edge 110 and outer edge 120 are positioned at two sides of a width direction of the fan blade structure 100, and the cambered surface 130 is connected between the inner edge 110 and the outer edge 120.

Referring to FIG. 3, in some examples, the inner edge 110 at least partially protrudes towards the leeward side, and the outer edge 120 protrudes towards the leeward side, such that areas of the fan blade structure 100 close to two ends thereof in a length direction are located at a front side, while an area close to a middle portion is located at a rear side. In other words, the fan blade structure 100 is arched backwards. In this way, when rotating at a high speed, the fan blade structure 100 can withstand a strong impact from the airflow and maintain a good condition without deformation or bending, thereby improving the overall strength and stability of the fan blade structure 100.

Referring to FIG. 1, the inner edge 110 extends obliquely upwards, gradually, from an end of the fan blade structure 100 close to a rotational axis 170 towards an end of the fan blade structure 100 facing away from the rotational axis 170, such that two ends of the inner edge 110 in the length direction are not in a same horizontal plane. Similarly, the outer edge 120 also extends obliquely upwards, gradually, from the end of the fan blade structure 100 close to the rotational axis 170 towards the end of the fan blade structure 100 facing away from the rotational axis 170, such that two ends of the outer edge 120 in the length direction are not in a same horizontal plane. Accordingly, as for the entire fan blade structure 100, an area close to the rotational axis 170 is lower than an area facing away from the rotational axis 170. On the one hand, a direction of airflow is improved to achieve a better blowing effect. On the other hand, when the fan blade structure 100 is applied to a fan or fan lamp, adjacent two fan blade structures 100 are arranged in a staggered manner and will not be in contact with each other during a folding process of the fan blade structures 100. Therefore, problems such as collisions between the adjacent two fan blade structures 100 that may result in significant noise or damage to the fan blade structure 100 can be avoided.

A horizontal height of the outer edge 120 is lower than a horizontal height of the inner edge 110, so that the cambered surface 130 connected between the inner edge 110 and the outer edge 120 extends curvedly downwards from the inner edge 110 to the outer edge 120. This results in that the fan blade structure 100 is higher at the windward side and lower at the leeward side. In this way, when the fan blade structure 100 rotates at a high speed, the airflow enters the fan blade structure 100 from the inner edge 110, and is guided by the cambered surface 130, and then flows out of the fan blade structure 100 from the outer edge 120, which changes the direction of the airflow and improves the windward effect, thereby improving the blowing effect of the fan blade structure 100 and overcoming the problem of insufficient wind power.

Figure 2:
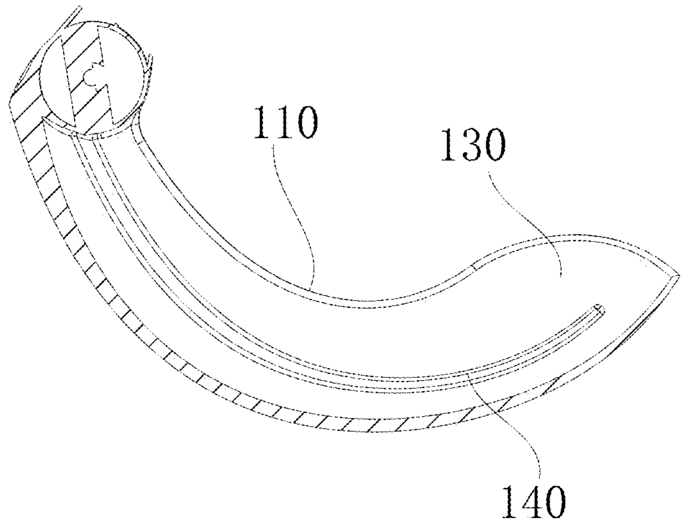
FIG. 2 is a sectional view taken along A-A in FIG. 1.

Referring to FIG. 2, a thickness of the fan blade structure 100 gradually decreases from the end close to the rotational axis to the end facing away from the rotational axis. In other words, a leading edge of the fan blade structure 100 is thinner and a root part of the fan blade structure 100 is thicker, which can enhance the overall strength and stability of the fan blade structure 100, thereby ensuring that the fan blade structure 100 will not deform or bend during a high-speed rotation, and ensuring the normal use of the fan blade structure 100.

Referring to FIG. 1 and FIG. 3, in some examples, a side surface of the fan blade structure 100 is provided with a reinforcing rib 140, which extends from an end close to the rotational axis to an end facing away from the rotational axis. Optionally, the side surface of the fan blade structure 100 can be provided with one reinforcing rib 140, and of course, two, three, five, or more reinforcing ribs 140 can also be provided. The specific number can be selected based on factors such as the required strength of the fan blade structure 100 and the overall quality of the fan blade structure 100. In addition, the reinforcing rib 140 can also be arranged in the middle of the fan blade structure 100 in a width direction. Of course, the reinforcing rib 140 can also be arranged at a side close to the inner edge 110 or at a side close to the outer edge 120. The specific arrangement position of the reinforcing rib 140 can be selected according to the actual situation. A cross section of the reinforcing rib 140 can be rectangular, trapezoidal, arc-shaped or the like.

In other examples, a cross-sectional area of the reinforcing rib 140 can be equal or unequal along a length direction of the reinforcing rib 140. Optionally, the cross-sectional area of the reinforcing rib 140 can gradually decrease or increase along a direction from the end of the fan blade structure 100 close to the rotational axis to the end of the fan blade structure 100 facing away from the rotational axis, so as to satisfy actual demands.

In other examples, the reinforcing ribs 140 can also be arranged at two opposite sides of the fan blade structure 100 to further enhance the strength of the fan blade structure 100.

Referring to FIG. 3, in some examples, the inner edge 110 includes a first cambered segment 111 and a second cambered segment 112 that are connected. The first cambered segment 111 protrudes towards the leeward side, the second cambered segment 112 protrudes towards the windward side, and the second cambered segment 112 is connected to the outer edge 120. Based on the above configuration, the fan blade structure 100 is formed with a relatively narrow cambered surface 130 between the first cambered segment 111 and the outer edge 120, and a relatively wide cambered surface 130 between the second cambered segment 112 and the outer edge 120. Considering that the airflow impact on the fan blade structure 100 gradually increases from the end of the fan blade structure 100 close to the rotational axis to the end of the fan blade structure 100 facing away from the rotational axis, the second cambered segment 112 protrudes towards the windward side, which allows the fan blade structure 100 to withstand greater airflow impact in this area, thereby ensuring the strength and stability of the fan blade structure 100 and improving the service life of the fan blade structure 100. At the same time, the fact that the second cambered segment 112 protrudes towards the windward side can also have a better guiding effect on the airflow, thereby reducing the resistance of the fan blade structure 100 to the airflow, reducing the energy consumption required for the rotation of the fan blade structure 100 to a certain extent, and reducing the noise. In addition, the first cambered segment 111 is designed to protrude towards the leeward side, which can also increase the airflow impact that the fan blade structure 100 can withstand, thus further improving the service life of the fan blade structure 100.

In some examples, the first cambered segment 111 has a first end 1111 facing away from the second cambered segment 112, and a second end 1112 connected to the second cambered segment 112. A curvature of the first cambered segment 111 gradually increases from the first end 1112 to the second end; that is, in a direction towards the second cambered segment 112, a degree of deformation of the first cambered segment 111 gradually increases. In this way, in the case where a curvature of the outer edge 120 remains basically unchanged, a width of the cambered surface 130 between the first cambered segment 111 and the outer edge 120 gradually increases, thereby improving the strength and stability of the fan blade structure 100 and ensuring its service life. Optionally, considering the significant airflow impact on the area close to the outer edge of the fan blade structure 100, the curvature of the outer edge 120 can also gradually increase from the end close to the rotational axis to the end facing away from the rotational axis. As the curvature of the outer edge 120 increases, the curvature of the first cambered segment 111 also increases. Furthermore, under the same rotation radius, the curvature of the first cambered segment 111 is greater than the curvature of the outer edge 120, so that a width of an area of the fan blade structure 100 corresponding to the first cambered segment 111 gradually increases, thereby ensuring the strength and stability of the fan blade structure 100.

In some examples, the second cambered segment 112 has a third end 1121 connected to the first cambered segment 111, and a fourth end 1122 connected to the outer edge 120. A curvature of the second cambered segment 112 gradually decreases from the third end 1121 to the fourth end. Based on this, an arc-shaped sharp structure can be formed at a connection between the second cambered segment 112 and the outer edge 120, thereby reducing a contact area between the end of the fan blade structure 100 and the airflow, and reducing the energy consumption caused by a resistance generated between the fan blade structure 100 and the airflow to a certain extent. In addition, the arc-shaped sharp structure can also discretize the vortices, thereby reducing the noise.

In other examples, the second cambered segment 112 has a peak distance relative to a line connecting the third end 1121 and the fourth end, at a position 1123 between the third end 1121 and the fourth end, while the curvature of the second cambered segment 112 gradually decreases from a position 1123 on the second cambered segment 112 corresponding to the peak distance to the third end 1121 or the fourth end; that is, a curvature of an area of the second cambered segment 112 close to a middle portion is larger, and a curvature of the third end 1121 or the fourth end 1122 of the second cambered segment 112 is smaller. In this way, a width between the area of the second cambered segment 112 close to the middle portion and the outer edge 120 is relatively large, thereby improving the strength and stability of the fan blade structure 100. Based on the above configuration, an arc-shaped sharp structure can also be formed between the fourth end 1122 of the second cambered segment 112 and the outer edge 120. The arc-shaped sharp structure can reduce a contact area between the end of the fan blade structure 100 and the airflow, reduce the energy consumption caused by the resistance generated between the fan blade structure 100 and the airflow to a certain extent, and disperse the airflow vortex, thereby reducing the noise.

Referring to FIG. 3, in some examples, a sharp angle structure 150 is formed at a connection between the second cambered segment 112 and the outer edge 120. By providing the sharp angle structure 150, on the one hand, a mass at a tail end of the fan blade structure 100 can be reduced, which is beneficial for the stability of the fan blade structure 100 during a high-speed rotation. On the other hand, the vortex at the tail end of the fan blade structure 100 can be discretized through the sharp angle structure 150, which is conducive to noise reduction.

Examples of the present disclosure further disclose a fan. The disclosed fan includes a fan body and a plurality of fan blade structures 100 as described above, and the plurality of fan blade structures 100 are arranged on the fan body and can be folded or unfolded. Optionally, the fan body includes a rotating assembly 200, a driving assembly 300, and a suspending assembly 500.

Figure 4:
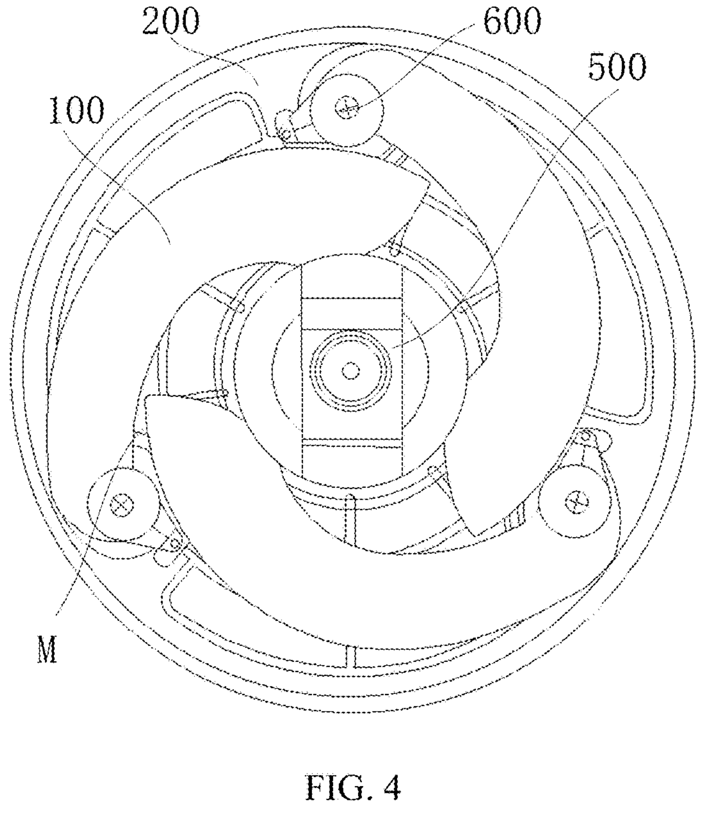
FIG. 4 is a first perspective view of a fan lamp disclosed in examples of the present disclosure.
Figure 5:
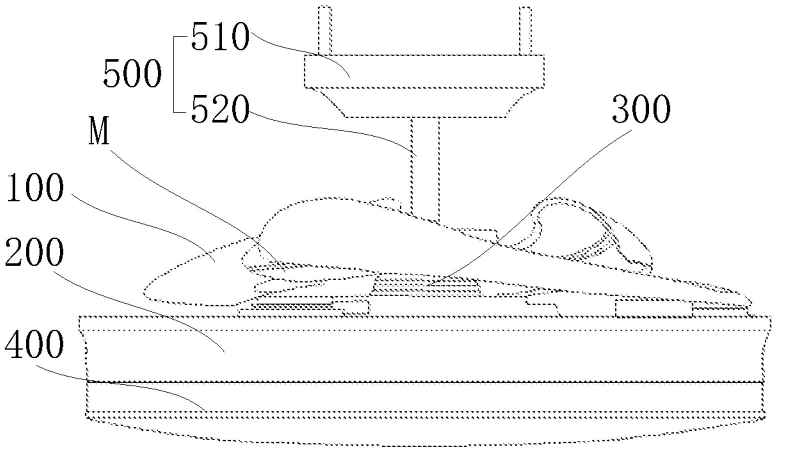
FIG. 5 is a second perspective view of a fan lamp disclosed in examples of the present disclosure.

Referring to FIG. 4 and FIG. 5, examples of the present disclosure also disclose a fan lamp. The disclosed fan lamp includes a fan lamp body and a plurality of fan blade structures 100 as described above. The plurality of fan blade structures 100 are arranged on the fan lamp body and can be folded or unfolded. Optionally, the fan lamp body includes a rotating assembly 200, a driving assembly 300, a lamp assembly 400, and a suspending assembly 500.

It should be noted here that, the above-mentioned fan lamp is additionally provided with a lamp assembly 400 based on the fan, to achieve the functions of blowing and lighting.

Figure 6:
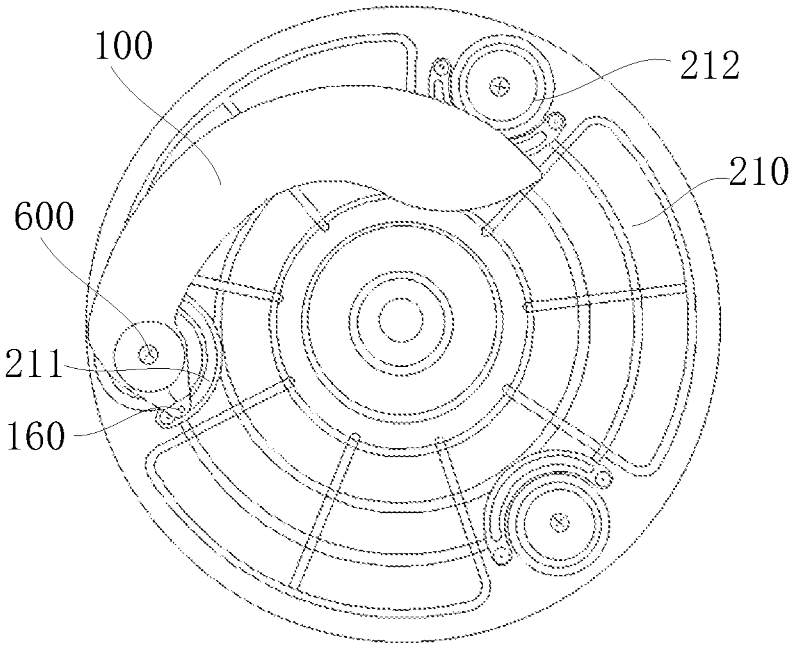
FIG. 6 is a schematic diagram of a fan blade structure that is folded relative to a rotating disk disclosed in examples of the present disclosure.
Figure 7:
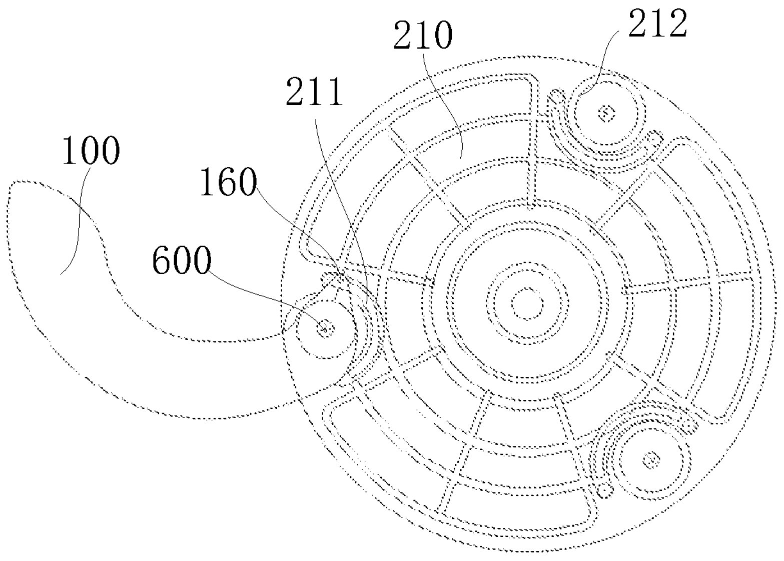
FIG. 7 is a schematic diagram of a fan blade structure that is unfolded relative to a rotating disk disclosed in examples of the present disclosure.

The rotating assembly 200 can rotate under the driving effect of the driving assembly 300, and the plurality of fan blade structures 100 are rotatably provided on the rotating assembly 200. Under the driving effect of the driving assembly 300, the rotating assembly 200 and the plurality of fan blade structures 100 on the rotating assembly 200 can rotate to achieve the blowing function. Referring to FIG. 6 and FIG. 7, optionally, the rotating assembly 200 includes a rotating disk 210. The rotating disk is connected to a driving end of the driving assembly 300 for rotation under the driving effect of the driving assembly 300. In order to assemble the fan blade structure 100, a plurality of installation parts 212 is provided and the plurality of installation parts 212 are arranged at intervals on an edge of the rotating disk 210. Correspondingly, the end of the fan blade structure 100 is equipped with a rotating structure. The rotating structure is arranged on the installation part 212 and is connected to the installation part 212 through a fastener 600. In this way, a relative rotation can be achieved between the fan blade structure 100 and the rotating disk 210 through the rotating structure and the installation part 212. The installation part 212 can be a groove, the rotating structure can be a protrusion, and the fastener 600 can be a fastening screw, a fastening bolt, a pin shaft, a pin, or the like.

In order to fold the fan blade structure 100 relative to the rotating disk 210, an elastic member is installed between the fan blade structure 100 and the rotating disk 210. Optionally, the elastic assembly can be a torsion spring, which is connected between the rotating structure and the installation part 212. Under the elastic force of the elastic member, the fan blade structure 100 always has a tendency to be folded. Based on the above configuration, in the case where the fan or the fan lamp is in a non-working state, the fan blade structure 100 does not rotate. At this time, under the elastic force of the elastic member, the plurality of fan blades are all folded on the rotating disk 210, thereby reducing the overall volume of the fan or the fan lamp and improving the appearance performance of the fan or the fan lamp. In the case where the fan or the fan lamp is in a working sate, the fan blade structure 100 rotates along with the rotating disk 210. At this time, the fan blade structure 100 is thrown outwardly under the action of a centrifugal force, and a speed of the fan blade structure 100 rotating along with the rotating disk 210 gradually increases. In the case where the centrifugal force is greater than the elastic force of the elastic member, the fan blade structure 100 is unfolded relative to the rotating disk 210, thereby achieving the blowing effect.

In addition, the driving assembly 300 in the examples of the present disclosure can include a driving motor. A fixed part of the driving motor is connected to the suspending assembly 500, and a rotating part of the driving motor is connected to the rotating disk 210, so that the rotating disk 210 can be driven to rotate by means of the driving motor, and the rotating disk 210 can drive the fan blade structure 100 to rotate to achieve the blowing function.

In order to achieve the lighting effect, examples of the present disclosure also include a lamp assembly 400. The lamp assembly 400 is located below the fan blade structure 100 and the rotating assembly 200, and the lamp assembly 400 is connected to the suspending assembly 500, thereby ensuring the hoist of the lamp assembly 400 and preventing the lamp assembly 400 from rotating and affecting the lighting effect.

Referring to FIG. 5, in order to hoist the fan lamp, the fan lamp in the examples of the present disclosure also includes a suspending assembly 500. Optionally, the suspending assembly 500 includes a fixed seat 510 and a connecting rod 520. The fixed seat 510 is fixed on the roof, one end of the connecting rod 520 is connected to the fixed seat 510, the other end of the connecting rod 520 is connected to the lamp assembly 400, and the rotating assembly 200 is rotatably connected to the connecting rod 520, thereby realizing the hoist of the fan lamp.

Of course, the suspending assembly 500 can also achieve the hoist of the fan, with the specific method basically like the method of hoisting the fan lamp as described above, which will not be repeated here.

It should be noted that, as for the specific structures of the rotating assembly 200, the driving assembly 300, the lamp assembly 400, and the suspending assembly 500 described above, reference can be made to relevant technologies. The specific structures of the above assemblies are not limited in the examples of the present disclosure.

Referring to FIG. 4, in some examples, in the case where the plurality of fan blade structures 100 are all folded on the fan body or the fan lamp body, adjacent two fan blade structures 100 are arranged in a staggered manner, with a horizontal height of the inner edge 110 of a preceding fan blade structure 100 being higher than a horizontal height of the outer edge 120 of a subsequent fan blade structure 100, and a gap M being formed therebetween. Based on the above configuration, in the case where the fan blade structure 100 is in a folded state, the adjacent two fan blade structures 100 will not come into contact with each other. Therefore, in an initial stage of the fan blade structure 100 unfolding relative to the rotating disk 210, due to the presence of the gap M, there will be no contact between the adjacent two fan blade structures 100, which effectively alleviates the problem that the fan blade structures 100 are easily damaged by collision and wear between the fan blade structures 100. At the same time, it can also reduce the noise generated by the collision between the fan blade structures 100. In addition, in the case where the fan blade structures 100 are in a folded state, the adjacent two fan blade structures 100 are arranged in a staggered manner, which can improve the arrangement efficiency of the plurality of fan blade structures 100, fully utilize the limited space on the rotating disk 210, and reduce the space occupied by the plurality of fan blade structures 100 on the rotating disk 210 to a certain extent. Therefore, with the same size and the same number of the fan blade structures 100, the overall volume of the fan or fan lamp can be made smaller.

In some examples, the inner edge 110 of the preceding fan blade structure 100 is higher than the outer edge 120 of the subsequent fan blade structure 100, thereby generating the gap M as mentioned above to ensure that the fan blade structure 100 can freely fold, unfold and rotate.

In some examples, the inner edge 110 and outer edge 120 are both spatial curves, so that the above-mentioned gap M can include at least one of a horizontal gap and a vertical gap. The horizontal gap refers to a radial gap of the fan or fan lamp, and the vertical gap refers to an axial gap of the fan or fan lamp. For example, it's possible that a vertical gap is formed between the inner edge 110 of the preceding fan blade structure 100 and the outer edge 120 of the subsequent fan blade structure 100 in a height direction; it's also possible that a horizontal gap is formed between the inner edge 110 of the preceding fan blade structure 100 and the outer edge of the subsequent fan blade structure 100 in a horizontal direction; it's still also possible that both the vertical gap in the height direction and the horizontal gap in the horizontal direction are formed between the inner edge 110 of the preceding fan blade structure 100 and the outer edge 120 of the subsequent fan blade structure 100. Based on the above configuration, a contact between adjacent two fan blade structures 100 is possible to be completely avoided.

Referring to FIG. 6 and FIG. 7, in order to enable a plurality of fan blade structures 100 to be synchronously unfolded or folded relative to the fan body or fan lamp body, in the examples of the present disclosure, a plurality of guiding grooves 211 is arranged on the fan body or fan lamp body. Correspondingly, the fan blade structures 100 have a plurality of guiding members 160. The guiding member 160 is correspondingly arranged in the guiding groove 211, and the guiding member 160 is movable relative to the guiding groove 211. In this way, in the case where the fan blade structure 100 is unfolded, the guiding member 160 moves to one end of the guiding groove 211; and in the case where the fan blade structure 100 is folded, the guiding member 160 moves to the other end of the guiding groove 211. Optionally, the guiding member 160 can be a guiding column, a guiding pin, a guiding shaft or the like, which is arranged at one end of the fan blade structure 100 close to the rotational axis. In addition, the guiding groove 211 can be an arc-shaped groove. Based on the above configuration, the plurality of fan blade structures 100 can be synchronously unfolded or folded through the plurality of guiding grooves 211, and the guiding groove 211 can also limit a rotation angle of the fan blade structure 100 relative to the fan body or the fan lamp body, so that the fan blade structure 100 satisfies the requirements of an unfolded state and a folded state, respectively.

Still with reference to FIG. 6 and FIG. 7, in some examples, the fan body or the fan lamp body includes a rotating disk 210, the plurality of guiding grooves 211 are arranged at intervals on the rotating disk 210, and the plurality of fan blade structures 100 are rotatably arranged on the rotating disk 210 at intervals, with the guiding member 160 of each of the fan blade structures 100 being corresponding arranged in the guiding groove 211. Based on the above configuration, not only the installation of the plurality of fan blade structures 100 can be achieved through the rotating disk 210, but also the plurality of fan blade structures 100 can be synchronously unfolded or folded; at the same time, the rotation angle of the fan blade structures 100 can be limited, thereby ensuring the normal operation of the fan or the fan lamp.

In summary, the fan blade structure 100 in the examples of the present disclosure has solved at least one of the problems of insufficient wind power, short service life, and loud noise, thereby greatly improving the user experience. At the same time, the fan blade structure 100 in the examples of the present disclosure is suitable for both fans and fan lamps, and the applied objects of the fan blade structure 100 are not limited in the examples of the present disclosure.

The objective of the examples of the present disclosure is to provide a fan blade structure, a fan, and a fan lamp that can solve at least one of the problems of low wind power, short service life and loud noise.

The present disclosure is realized as follows.

The examples of the present disclosure provide a fan blade structure, including:

an inner edge, located at a windward side, wherein the inner edge at least partially protrudes towards a leeward side, and the inner edge extends obliquely upwards, gradually, from one end of the fan blade structure close to a rotational axis to one end of the fan blade structure facing away from the rotational axis;

an outer edge, located at the leeward side, wherein the outer edge protrudes towards the leeward side, and the outer edge extends obliquely upwards, gradually, from the end of the fan blade structure close to the rotational axis to the end of the fan blade structure facing away from the rotational axis, and a horizontal height of the outer edge is lower than a horizontal height of the inner edge; and a cambered surface, wherein the cambered surface is connected between the inner edge and the outer edge, and the cambered surface extends curvedly downwards from the inner edge to the outer edge; wherein a thickness of the fan blade structure decreases from the end close to the rotational axis to the end facing away from the rotational axis.

The examples of the present disclosure provide a fan, including a fan body and a plurality of fan blade structures as described above;

the plurality of fan blade structures are arranged on the fan body, and can be folded or unfolded.

The examples of the present disclosure provide a fan lamp, including a lamp assembly and the fan as described above;

the lamp assembly is arranged at a lower part of the fan.

In the examples of the present disclosure, the fan blade structure includes an inner edge, an outer edge, and a cambered surface. The inner edge at least partially protrudes towards a leeward side, and the outer edge protrudes towards the leeward side, such that both ends of the fan blade structure face a windward side while an area between the two ends faces the leeward side.

Thus, in the case where the fan blade structure rotates at a high speed and hence is subjected to airflow impact, it is less susceptible to deformation, thereby enhancing an overall strength and stability of the fan blade structure. A horizontal height of the outer edge is lower than a horizontal height of the inner edge, i.e., the windward side of the fan blade structure is higher while the leeward side is lower; moreover, a cambered surface is connected between the inner edge and the outer edge, and the cambered surface extends curvedly downwards from the inner edge to the outer edge, which greatly improves a windward effect of the fan blade structure and hence enhances a blowing effect of the fan blade structure, thereby overcoming the problem of insufficient wind power. The inner edge extends obliquely upwards, gradually, from one end close to a rotational axis towards one end facing away from the rotational axis, such that two ends of the inner edge are not at the same horizontal plane.

Similarly, the outer edge extends obliquely upwards, gradually, from one end close to the rotational axis towards one end facing away from the rotational axis, such that two ends of the outer edge are not at the same horizontal plane. In this way, for the overall fan blade structure, an area close to the rotational axis is lower than an area facing away from the rotational axis.

Therefore, in the case where the fan blade structure is applied to a fan or a fan lamp, when a plurality of fan blades is folded, adjacent fan blades can be arranged in a staggered manner without any contact between each other, thus effectively alleviating a damage to the fan blade structure due to a collision between adjacent fan blade structures. In addition, the thickness of the fan blade structure decreases from the end close to the rotational axis towards the end facing away from the rotational axis, i.e., a leading edge of the fan blade structure is thinner while a root part thereof is thicker, thereby enhancing the overall strength of the fan blade structure to ensure that the fan blade structure will not deform or bend during a high-speed rotation and maintain the normal use of the fan blade structure.

The present disclosure solves the problems such as low wind power, short service life, and loud noise in the fan or fan lamp.

The examples of the present disclosure have been described above with reference to the accompanying drawings, but the present disclosure is not limited to the above examples, which are only illustrative and are not limitative. Under the inspiration of the present disclosure, ordinary skilled in the art can make many forms without departing from the purpose of the present disclosure and the scope, which are all within the protection of the present disclosure.

What is claimed is:

1. A fan blade structure, comprising:

an inner edge, located at a windward side, wherein the inner edge at least partially protrudes towards a leeward side, and the inner edge extends obliquely upwards, from one end of the fan blade structure close to a first rotational axis to one end of the fan blade structure facing away from the first rotational axis, to form an inner angle with the first rotational axis, wherein the inner angle remains less than 90 degrees as the inner edge extends obliquely upwards, and the inner edge comprises a first cambered segment and a second cambered segment, the first cambered segment connects to the second cambered segment, the first cambered segment and the second cambered segment are disposed on a same side relative to the first rotational axis, the first cambered segment protrudes towards the leeward side, and the second cambered segment protrudes towards the windward side;

an outer edge located at the leeward side, wherein the outer edge protrudes towards the leeward side, and the outer edge extends obliquely upwards, from the end of the fan blade structure close to the first rotational axis to the end of the fan blade structure facing away from the first rotational axis, to form an outer angle with the first rotational axis, and a horizontal height of the outer edge is lower than a horizontal height of the inner edge, wherein the outer angle remains less than 90 degrees as the outer edge extends obliquely upwards; and a cambered surface, wherein the cambered surface is connected between the inner edge and the outer edge, and the cambered surface extends curvedly downwards from the inner edge to the outer edge, wherein a thickness of the fan blade structure decreases from the end close to the first rotational axis to the end facing away from the first rotational axis, the fan blade structure is configured to be folded or unfolded with a rotating assembly of a fan via the first rotational axis, and the rotating assembly is configured to rotate around a second rotational axis such that the fan blade structure rotates with the rotating assembly to realize blowing.

2. The fan blade structure according to claim 1, wherein the fan blade structure is provided with a reinforcing rib, and the reinforcing rib extends from the end close the first rotational axis to the end facing away from the first rotational axis.

3. The fan blade structure according to claim 1, wherein the second cambered segment is connected to the outer edge.

4. The fan blade structure according to claim 3, wherein the first cambered segment is provided with a first end facing away from the second cambered segment and a second end connected to the second cambered segment, and a curvature of the first cambered segment increases from the first end to the second end.

5. The fan blade structure according to claim 3, wherein:

the second cambered segment is provided with a third end connected to the first cambered segment and a fourth end connected to the outer edge;

a curvature of the second cambered segment decreases from the third end to the fourth end; or, the second cambered segment has a peak distance with a line connecting the third end and the fourth end, at a position between the third end and the fourth end, and a curvature of the second cambered segment decreases from a position on the second cambered segment corresponding to the peak distance to the third end or the fourth end.

6. The fan blade structure according to claim 3, wherein a connection between the second cambered segment and the outer edge is formed as a sharp angle structure.

7. A fan, comprising:

a fan body, and a plurality of fan blade structures, wherein the plurality of fan blade structures are arranged at the fan body, and can be folded or unfolded, and wherein:

a fan blade structure of the plurality of fan blade structures comprises:

an inner edge, located at a windward side, wherein the inner edge at least partially protrudes towards a leeward side, and the inner edge extends obliquely upwards, from one end of the fan blade structure close to a first rotational axis to one end of the fan blade structure facing away from the first rotational axis, to form an inner angle with the first rotational axis, wherein the inner angle remains less than 90 degrees as the inner edge extends obliquely upwards, and the inner edge comprises a first cambered segment and a second cambered segment, the first cambered segment connects to the second cambered segment, the first cambered segment and the second cambered segment are disposed on a same side relative to the first rotational axis, the first cambered segment protrudes towards the leeward side, and the second cambered segment protrudes towards the windward side;

an outer edge located at the leeward side, wherein the outer edge protrudes towards the leeward side, and the outer edge extends obliquely upwards, from the end of the fan blade structure close to the first rotational axis to the end of the fan blade structure facing away from the first rotational axis, to form an outer angle with the first rotational axis, and a horizontal height of the outer edge is lower than a horizontal height of the inner edge, wherein the outer angle remains less than 90 degrees as the outer edge extends obliquely upwards; and a cambered surface, wherein the cambered surface is connected between the inner edge and the outer edge, and the cambered surface extends curvedly downwards from the inner edge to the outer edge, wherein a thickness of the fan blade structure decreases from the end close to the first rotational axis to the end facing away from the first rotational axis, and the fan blade structure is configured to be folded or unfolded with the fan body via the first rotational axis.

8. The fan according to claim 7, wherein in a case where the plurality of fan blade structures are all folded at the fan body, adjacent two fan blade structures are arranged in a staggered manner, and a horizontal height of the inner edge of a preceding fan blade structure is higher than a horizontal height of the outer edge of a subsequent fan blade structure such that a gap (M) is formed therebetween.

9. The fan according to claim 7, wherein the fan body is provided with a guiding groove, the fan blade structure is provided with a guiding member, and the guiding member is movably arranged in the guiding groove; in a case where the fan blade structure is unfolded, the guiding member is moved to one end of the guiding groove, and in a case where the fan blade structure is folded, the guiding member is moved to the other end of the guiding groove.

10. The fan according to claim 9, wherein the fan body comprises a rotating disk, a plurality of guiding grooves is arranged at intervals on the rotating disk, a plurality of fan blade structures is arranged rotatably on the rotating disk, and the guiding member of each of the plurality of fan blade structures is correspondingly arranged in the guiding groove.

11. A fan lamp, comprising:

a lamp assembly, and a fan, wherein the lamp assembly is arranged at a lower part of the fan, and the fan comprises:

a fan body, and a plurality of fan blade structures, wherein the plurality of fan blade structures are arranged at the fan body, and can be folded or unfolded, and wherein:

a fan blade structure of the plurality of fan blade structures comprises:

an inner edge, located at a windward side, wherein the inner edge at least partially protrudes towards a leeward side, and the inner edge extends obliquely upwards, from one end of the fan blade structure close to a first rotational axis to one end of the fan blade structure facing away from the first rotational axis, to form an inner angle with the first rotational axis, wherein the inner angle remains less than 90 degrees as the inner edge extends obliquely upwards, and the inner edge comprises a first cambered segment and a second cambered segment, the first cambered segment connects to the second cambered segment, the first cambered segment and the second cambered segment are disposed on a same side relative to the first rotational axis, the first cambered segment protrudes towards the leeward side, and the second cambered segment protrudes towards the windward side;

an outer edge located at the leeward side, wherein the outer edge protrudes towards the leeward side, and the outer edge extends obliquely upwards, from the end of the fan blade structure close to the first rotational axis to the end of the fan blade structure facing away from the first rotational axis, to form an outer angle with the first rotational axis, and a horizontal height of the outer edge is lower than a horizontal height of the inner edge, wherein the outer angle remains less than 90 degrees as the outer edge extends obliquely upwards; and a cambered surface, wherein the cambered surface is connected between the inner edge and the outer edge, and the cambered surface extends curvedly downwards from the inner edge to the outer edge, wherein a thickness of the fan blade structure decreases from the end close to the first rotational axis to the end facing away from the first rotational axis, and the fan blade structure is configured to be folded or unfolded with the fan body via the first rotational axis.

12. The fan blade structure according to claim 1, wherein the inner edge extends upwards more inclinedly than the outer edge.

* * * * *